Jan. 21, 1958 E. V. FOSTER 2,820,602
AUTOMATIC JETTISONING SYSTEM FOR AIRCRAFT SEATS
Filed Aug. 29, 1955 2 Sheets-Sheet 1
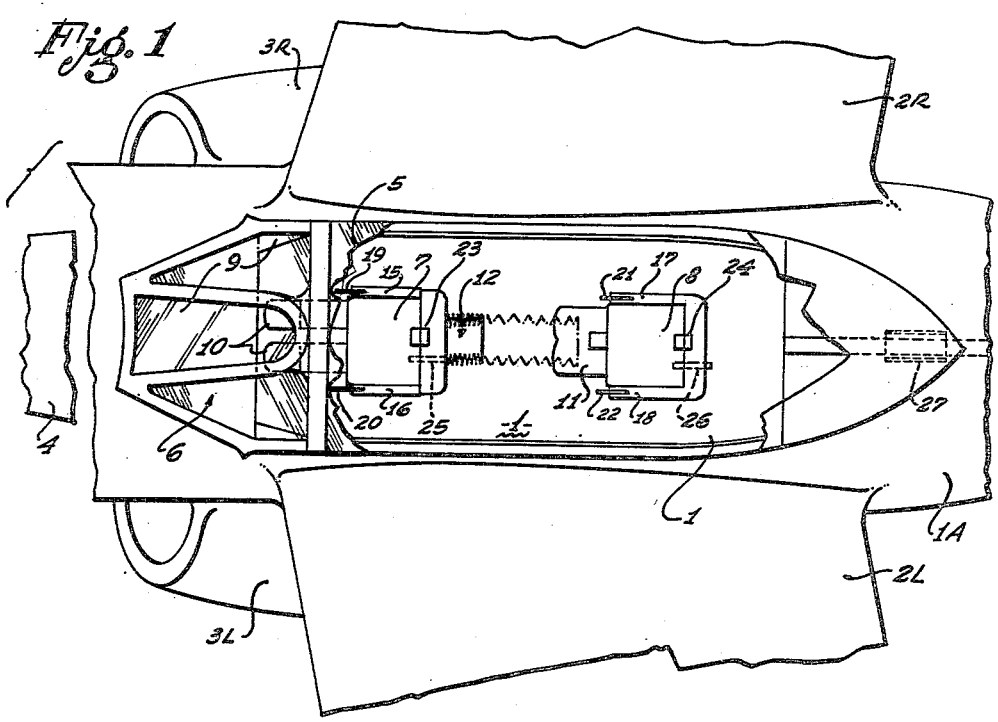
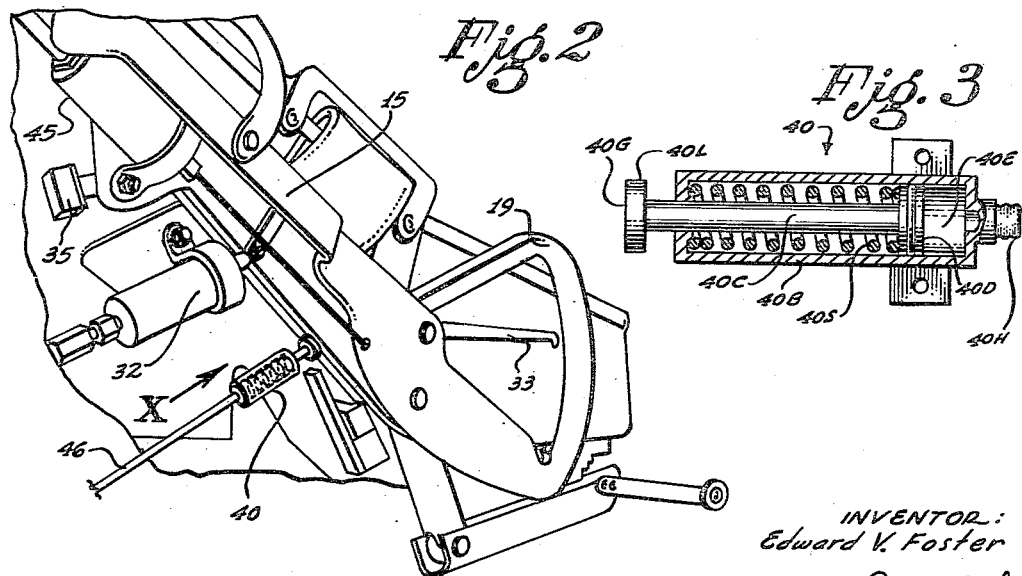
INVENTOR:
Edward V. Foster
By Herbert E. Metcalf
His Patent Attorney Jan. 21, 1958     E. V. FOSTER     2,820,602
AUTOMATIC JETTISONING SYSTEM FOR AIRCRAFT SEATS
Filed Aug. 29, 1955     2 Sheets-Sheet 2
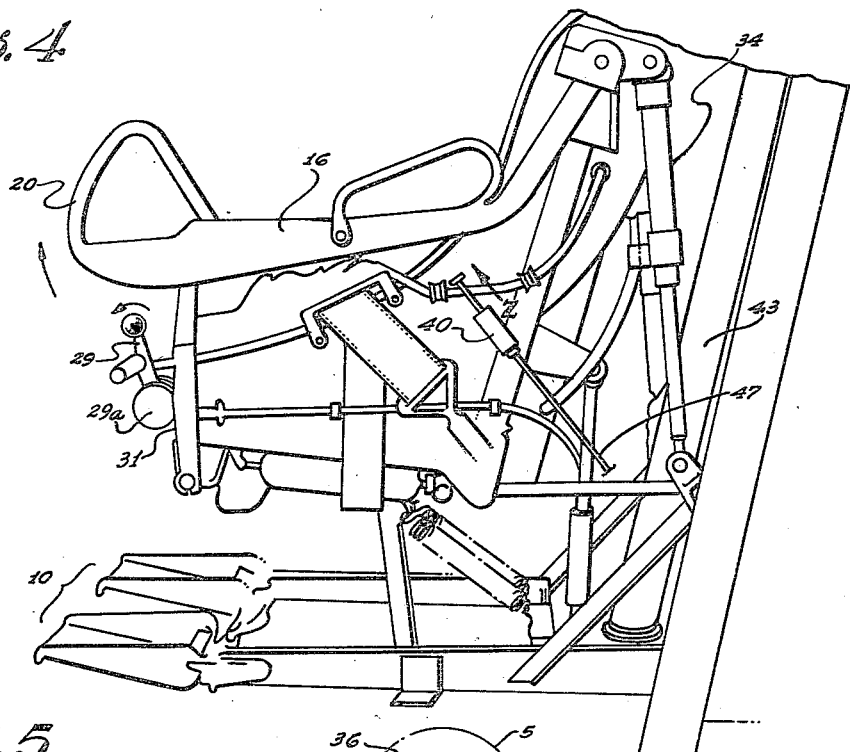
Fig. 4
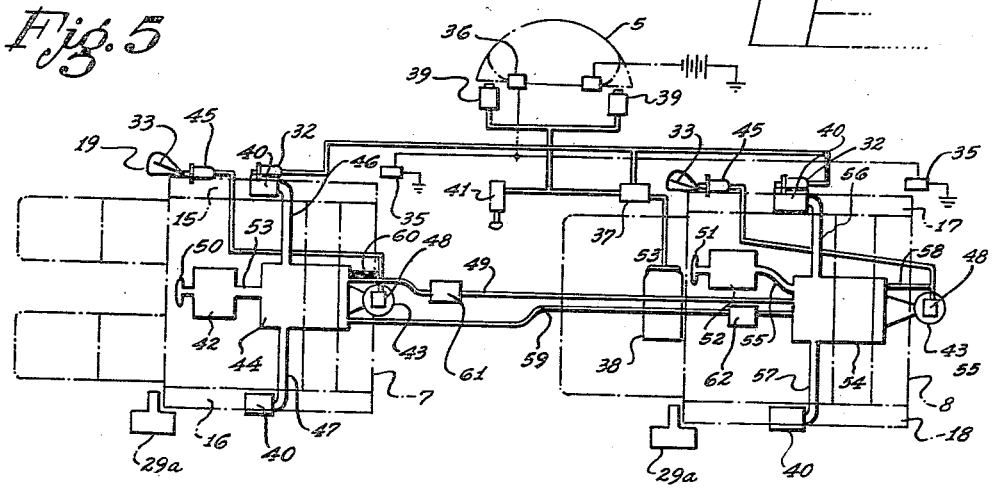
Fig. 5
INVENTOR
Edward V. Foster
His Patent Attorney United States Patent Office 2,820,602
Patented Jan. 21, 1958

2,820,602

AUTOMATIC JETTISONING SYSTEM FOR AIRCRAFT SEATS

Edward V. Foster, Manhattan Beach, Calif., assignor to Northrop Aircraft, Inc., Hawthorne, Calif., a corporation of California Application August 29, 1955, Serial No. 531,055

5 Claims. (Cl. 244—122)

This invention relates to automatic jettisoning equipment used in aircraft and more particularly to a personnel survival system wherein the operation of an emergency initiating control by any one of a plurality of crew members results in the ejection of all crewmen from the airplane automatically and sequentially.

Consider, for example, the most common situation in which a pilot and a radar observer constitute the crew of an aircraft and in which the ejection or jettisoning controls are independently operated by the individual crew members. In ejection systems of this type it is necessary for each member of the crew to be conscious enough to manipulate both of the arm rests of his seat in order to be properly and safely ejected. If one member of the crew, either the pilot or the radar observer, is critically injured and is uable to perform the necessary sequential manipulations of the arm rests the other crewman is powerless to perform these manipulations for him.

With the foregoing in mind one important object of this invention is the provision of ejection means by which all crew members of a disabled plane may be ejected by the operation of a single initiating device.

Another object of this invention is the provision of ejection initiating means that may be used in combination with presently installed individually initiated ejection systems.

A further object of this invention is the provision of means employing the use of items of standard make and specifications, assembled in a manner to perform a new function, and thereby eliminate all of the testing and experimentation that might otherwise be involved.

Another object of this invention is the provision of means which can be added to any aircraft presently incorporating a powered jettisoning system with a minimum of modification.

In brief, my invention includes the provision of master controls located adjacent each crewman's seat whereby the entire personnel survival system can be operated as long as any crewman has one free hand with which to actuate a respective master control. Mechanical components of this system include cartridge powered initiators, rigid metal and flexible reinforced tubing, and simple lineal actuators to activate the various component systems instead of using mechanical linkage, and manual, hydraulic and other power sources. Pressure from the basic initiator is delivered to a pressure chamber from which it is directed through various conduits to operate a plurality of secondary system controls normally triggered by manipulation of the arm rests by each crewman.

The term "initiator" as used throughout this application and the appended claims refers to a device employing an explosive charge (cartridge) for producing a pressurized gas. Initiators may be fired mechanically or by fluid pressure. "Instantaneous initiators" fire immediately upon the actuation of their firing mechanism while in "delay initiators" the firing is delayed for a predetermined time after their firing mechanism is actuated. Initiators are designed to eliminate cables, linkages, push rods, etc., from personnel ejection systems or the like.

Numerous other objects and advantages of this system will become apparent in the following detailed specification when read in conjunction with the accompanying drawings, in which:

Figure 1 is a diagrammatic plan view typical of a two place jet fighter airplane showing the pilot's and the radar operator's seats and functional elements involved in the system.

Figure 2 is a partial view of the right side of the pilot's seat, showing certain of the operative components.

Figure 3 is a sectional view of a pressure operated piston used in the instant invention to raise the arm rests of the pilot's and radar observer's seats.

Figure 4 is a left side view of the pilot's seat.

Figure 5 is a schematic showing of a typical jettisoning system as disclosed herein.

Referring to Figure 1 a partial plan view of a fighter type airplane is shown consisting of the following structural elements: a cockpit 1, a fuselage 1-A, inner wing portions 2-R and 2-L, engine bays 3-R and 3-L, nose section 4, windshield 6, and canopy 5. Positioned in the cockpit 1 are pilot's and radar observer's seats 7 and 8, respectively, instrument panels 9, pilot's foot rests 10, radar observer's foot rests 11, and a radarscope 12, the latter being shown in its retracted and extended positions by solid and phantom construction, respectively. The pilot's seat arm rests are identified as 15 and 16, those of the radar observer's seat as 17 and 18, and hand grips extending outwardly from each of the above arm rests are identified by the numerals 19, 20, 21, and 22. Pilot's and observer's head rests are indicated by the numerals 23 and 24, respectively.

Under present conventional systems, employing the most modern type of ejection equipment, each seat is operated separately and independently, that is there is no intercommunication or cooperation between the two seat mechanisms. Each crewman must operate substantially similar controls the majority of which are shown schematically in Figure 5.

During a bailing-out operation, assuming that conventional equipment is utilized, the pilot first raises his left arm rest 16 to a horizontal position. This movement brings the hand grip 20 into contact with the roller guide of the pilot's inertia reel locking handle 29 moving the inertia reel 29a into its locked position. This movement of the arm rest 16 also insures that the pilot's shoulder harness will be secured in position and locked prior to the ejection of his seat. This is the only function accomplished by the operation of the left arm rest 16. Spring means (not shown) and overcenter linkage 31 serve to assist and maintain the arm rest 16 in a substantially horizontal position as shown in Figure 4.

The pilot now elevates his right arm rest 15 from the normal or lowered position, as shown in Figure 2, to a substantially horizontal position. Initial movement of the arm rest 15 actuates a canopy retention microswitch 35 thereby breaking the circuit to the canopy retention solenoids 36 rendering them ineffective to retain the canopy 5 in position. Further upward movement of the arm rest 15 actuates an instantaneous type canopy initiator 32. Pressurized fluid is directed from the initiator 32 to a pressure sensitive shutoff valve 37. The valve 37 is opened directing pressurized fluid from an air bottle 38 to the canopy jettison cylinders 39 and the radar-scope retraction cylinder 41. Thus the canopy 5 is jettisoned and the radar-scope is retracted.

As the right arm rest 15 approaches its horizontal position the pilot's seat 7 is bottomed by apparatus (not shown). Bottoming of the pilot's seat enables the catapult device 43 to effectively exert its full force in ejecting the seat.

As the arm rest 15 reaches its horizontal position a cam mechanism (not shown) positions a trigger member 33 centrally of the opening defined by the hand grip 19. The pilot then manually moves the member 33 in a direction toward the upper portion of the hand grip 19. This action actuates the instantaneous type catapult initiator 45 creating a pressurized fluid therein. This fluid is directed to a delay type initiator 48 mounted on the upper end of the telescoping catapult device 43. After a predetermined time interval the cartridge in the initiator 48 is fired which in turn fires the main catapult charge (not shown) which actuates the catapult and the seat 7 is ejected. Operating steps in ejecting the radar observer's seat 8 are the same as those described above with the exception that the radar observer's seat is not adjustable and, therefore, does not have to be bottomed.

The schematic diagram in Figure 5 indicates the manner in which the system of this invention is integrated with the existing manually operable controls as described above and serves to automatically operate all controls. The two rectangular areas 7 and 8 indicate the general areas of the pilot's and radar observer's seats. Elements 42 and 52, which are secured to the bottoms of the seats 7 and 8, are standard instantaneous type initiators and are provided with T-handles 50 and 51 extending outwardly to the front edge of the seats. Cartridges contained in the elements 42 and 52 are fired when their triggering buttons are depressed, that is at such times as the T-handle members are pulled outwardly. In other types a sear pin may be withdrawn to effect the firing of the aforementioned cartridges.

A fluid actuated piston device 40 is also used in my emergency control system as shown in detail in Figure 2. The piston device includes a conventional cylindrical member 40-B, having an aperture in one end thereof through which a rod 40-C is slidably mounted, and an aperture at the opposite end for admission of a pressurized fluid entering through a pressure line fitting 40-H into the expansion chamber 40-E, thus forcing piston member 40-D in a direction compressing a helical spring 40-S and extending the head 40-L outwardly of the cylinder 40-B thereby causing the face 40-G of the head into contacting relation with any object to be moved.

Also shown in Figure 5 are containers 44 and 54 defining fluid pressure chambers. These containers are located adjacent seats 7 and 8, respectively, and may be positioned therebeneath. Conduits 53 and 55 provide fluid communication between the initiators 42 and 52 and containers 44 and 54. Transfer and equalizing conduits 49 and 59 extend between the containers 44 and 54. Mounted in the conduits 49 and 59 are instantaneous type booster initiators 61 and 62, respectively, adapted to supply additional pressurized fluid to the containers 44 and 54 when activated. The initiator 61 is activated by pressurized fluid from the container 54 flowing through the conduit 49 and functions to augment the fluid supply in the container 44. Similarly the initiator 62 is activated by pressurized fluid from the container 44 flowing through the conduit 59 and functions to augment the fluid supply in the container 54. Conduits 46 and 47 provide fluid communication between the container 44 and the piston devices 40 associated with the seat 7. These piston devices when actuated by fluid from the container 44 function to move the arm rests 15 and 16 from their lowered to their elevated positions. Conduits 56 and 57 provide fluid communication between the container 54 and the piston devices 40 associated with the seat 8 and function to move the arm rests 17 and 18 from their lowered to their elevated position when actuated.

Conduits 58 and 60 provide unidirectional fluid flow from the containers 44 and 54 to the catapult ejecting devices 43. As previously explained these devices are equipped with delay type initiators which have different time delay intervals. This insures that the pilot and radar observer will not be ejected simultaneously but at slightly different times.

Assuming that the initiator 52 is fired it creates a fluid pressure in the container 54 which subsequently fires the initiator 61 to augment fluid pressure in container 44. Subsequently, due to the fluid pressure in container 44 the initiator 62 will be fired further augmenting the fluid pressure in container 54. These booster initiators provide a safety factor insuring that sufficient fluid pressure will be present in the ejection system if it is not provided by the initiator 52.

The automatic survival system disclosed herein will function to eject both crewmen upon the actuation of either initiator 42 or 52. For purposes of illustration it may be assumed that the pilot is incapable of operating his initiator and it becomes necessary for both crewmen to bail out.

Under the above conditions the radar observer actuates the initiator 52 by pulling forward on the handle 51. An explosive charge in the initiator 52 is fired filling the container 54 with pressurized gas. This pressurized gas flows to the container 44 through the conduit 49 firing the booster initiator 61 en route. Pressurized fluid from the container 44 now flows through conduit 59 firing the booster initiator 62. Thus the fluid pressure in the system is augmented by the booster initiators 61 and 62.

Pressurized fluid now flows to all of the piston devices 40. These devices are actuated thereby urging the arm rests 15-18, inclusive, to their elevated positions. This movement of the arm rests results in the ejection of the canopy 5, retraction of the radar-scope 12, and securing of each crewman in his respective seat in a manner as previously described in connection with the manual operation of the arm rests.

Pressurized fluid from the containers 44 and 54 is also directed to the delay initiators 48 through the conduits 60 and 58 thus precluding the necessity for manual operation of trigger member 33. After a predetermined time interval the main catapult explosive charge is fired and the pilot's and radar observer's seats are sequentially ejected.

From the above disclosure it will be apparent that a minimum of equipment has been added to a conventional manually operated survival system which enables one crewman to effect the ejection of all crewmen.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an aircraft, a personnel survival system comprising: a pair of seat assemblies mounted in said aircraft in spaced relation; each of said seat assemblies including a personnel seat and a fluid actuated catapult; container means defining a chamber for receiving a pressurized fluid; a pair of initial gas generating means located respectively adjacent each of said seat assemblies; and conduit means providing fluid communication between said initial generating means, said chamber, and said catapults whereby said catapults are actuated and function to eject said personnel seats from said aircraft at such time as said initial generating means are actuated.

2. In an aircraft, a personnel survival system comprising: a pair of seat assemblies mounted in said aircraft in spaced relation; each of said seat assemblies including a personnel seat and a fluid actuated catapult; container means defining a pair of chambers for receiving a pressurized fluid and in which one of said chambers is located adjacent each of said seat assemblies; a pair of initial gas generating means one of which is adapted to deliver fluid directly to one of said chambers and the other of said initial gas generating means adapted to deliver fluid directly to the other of said chambers; first conduit means mounted to provide fluid communication between each of said initial generating means and a respective one of said chambers; and second conduit means providing fluid communication between said chambers and catapults whereby the latter are actuated and function to eject said personnel seats at such time as said initial generating means is actuated.

3. Apparatus as set forth in claim 2: further characterized in that said second conduit means includes a pair of connecting conduits providing fluid communication between said chambers and a gas booster generating means located in each of said connecting conduits and which function to supply pressurized gas to said chambers at such time as the fluid pressure in said chambers reach a predetermined amount.

4. In an aircraft, a personnel survival system comprising: a pair of seat assemblies mounted in said aircraft in spaced relation: each of said seat assemblies including a personnel seat equipped with pivotal arm rests and a fluid actuated catapult; container means defining a chamber for receiving a pressurized fluid; a pair of initial gas generating means located respectively adjacent each of said seat assemblies: a piston type actuator mounted adjacent each of said arm rests adapted to move said arm rests from a lowered to elevated position when actuated; and conduit means providing fluid communication between said initial generating means, said chamber, said actuators and said catapults whereby said actuators are actuated to elevate said arm rests and said catapults actuated and function to eject said personnel seats from said aircraft at such time as said initial generating means are actuated.

5. Apparatus as set forth in claim 4: further characterized by including at least one gas booster generating means mounted in said conduit means and which functions to supply pressurized gas to said chamber at such time as the fluid pressure in said chamber, provided by said initial gas generating means, reaches a predetermined amount.

References Cited in the file of this patent

UNITED STATES PATENTS 2,709,556    Jandris _____ May 31, 1955